(12) United States Patent
Fischer et al.

(10) Patent No.: US 6,460,501 B1
(45) Date of Patent: Oct. 8, 2002

(54) AIR SUCTION DEVICE FOR INTERNAL COMBUSTION ENGINE

(75) Inventors: Christian Fischer, Fellbach; Rudolf Leipelt, Marbach; Olaf Weber, Leonberg, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/462,419
(22) PCT Filed: Jul. 4, 1998
(86) PCT No.: PCT/EP98/04145
§ 371 (c)(1),
(2), (4) Date: Mar. 28, 2000
(87) PCT Pub. No.: WO99/02827
PCT Pub. Date: Jan. 21, 1999

(30) Foreign Application Priority Data

Jul. 9, 1997 (DE) .......................................... 197 29 217

(51) Int. Cl.$^7$ ................................................ F02M 35/10
(52) U.S. Cl. ................................................ 123/184.55
(58) Field of Search ....................... 123/184.55, 184.61, 123/184.51

(56) References Cited

U.S. PATENT DOCUMENTS 4,565,166 A * 1/1986 Takeda .................. 123/184.55
5,769,045 A * 6/1998 Edwards et al. ....... 123/184.61

* cited by examiner

Primary Examiner—Willis R. Wolfe
Assistant Examiner—Jason Benton
(74) Attorney, Agent, or Firm—Crowell & Moring LLP

(57) ABSTRACT

An air intake device for an internal combustion engine, in which the device includes at least one collecting vessel (10) as well as a plurality of intake ducts which extend separately toward different cylinders in the engine. The intake ducts extend into the collecting vessel and are formed from a flexible tube (16), such as a synthetic resin tube.

8 Claims, 2 Drawing Sheets

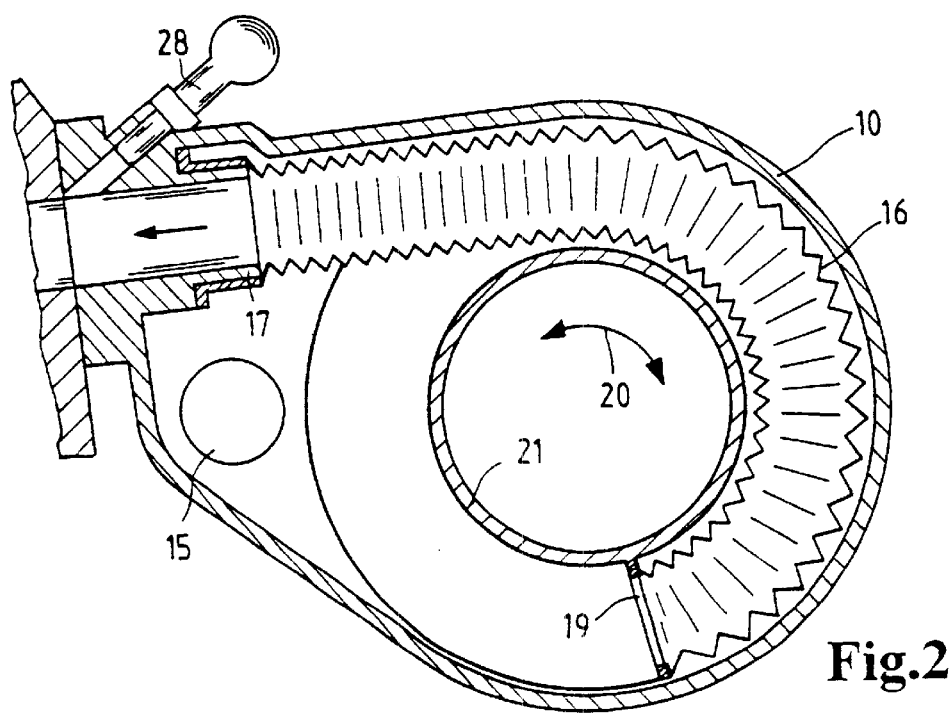
Fig.2
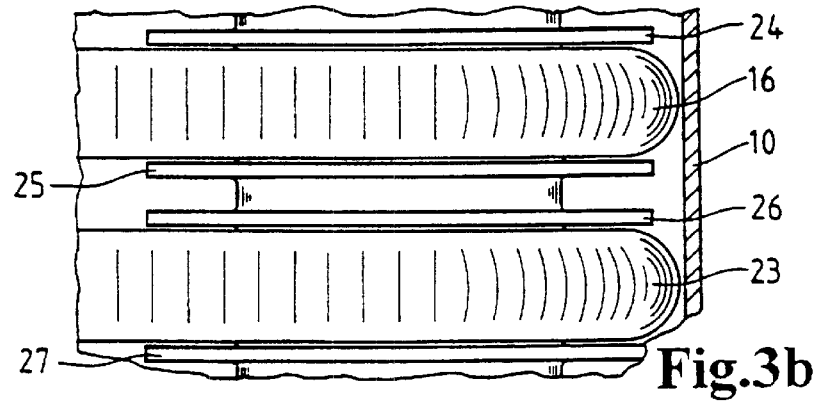
Fig.3b
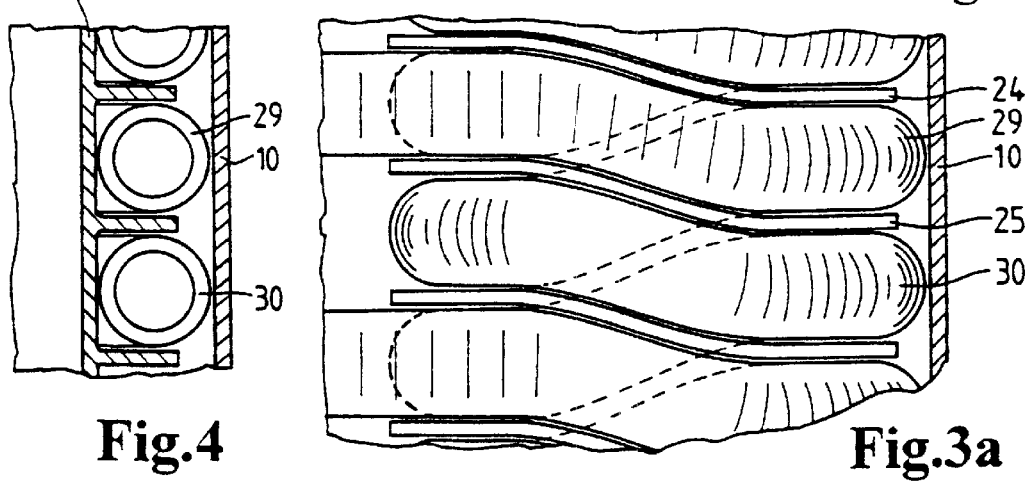
Fig.4
Fig.3a

AIR SUCTION DEVICE FOR INTERNAL COMBUSTION ENGINE

BACKGROUND OF THE INVENTION

The invention relates to an air intake device for internal combustion engines

An air intake device is disclosed in DE 40 03 492. It provides for a collector which is rotatable about its axis. A part that is continuously variable in length branches out to each cylinder of the internal combustion engine. This part is an intake duct made of a synthetic resin tube of flexible length and is reinforced by spiral springs.

A disadvantage of this air intake device is that the tube disposed outside of the collector becomes dirty, and moreover there is a danger that the tube may break or become leaky due to mechanical influences.

Another disadvantage is that atmospheric pressure bears against an externally situated tube. With increasing engine speed and consequently increasing vacuum in the air intake, the tube thus is increasingly exposed to mechanical stress. Unless reinforced by a spiral spring the tube walls must be so stiff that, in an intake tube of continuously variable length, the possible variation in length is too greatly limited, and with it the maximum possible range of adjustment.

Precisely in the case of air intake systems for internal combustion engines it is necessary to make the possible change of length as great as possible in order to optimally adapt the air intake line to the corresponding engine speed. In the state of the art the adaptation can only be made by a rotation of approximately 270°. EP 0 747 584 furthermore discloses an air intake system for an internal combustion engine in which a pivotable intake tube portion is provided. By pivoting this intake tube portion, two predefined intake tube lengths can be established. A variable adaptation of the intake tube length is not possible.

DE 38 25 000 describes an air intake duct of internal combustion engines with a continuously variable effective length, wherein an intake channel is provided in which a slide is mounted. A channel is opened or closed and the channel length adjusted depending on the position of the slide. A disadvantage of this system is that the structure involves large friction losses and the arrangement of the slide in the air intake duct of an internal combustion engine can be achieved industrially only at a disproportionately great cost.

SUMMARY OF THE INVENTION

It is therefore the object of the invention to provide an air intake device which avoids the described disadvantages, can be manufactured economically and operates reliably. This object is achieved by the invention as described and claimed hereinafter.

The substantial advantages of the invention lie in the fact that a flexible tube is also used for the intake ducts, but it is arranged to be protected within the collector.

According to one embodiment of the invention, the length and the diameter of the flexible tube can be adapted in a simple manner to the particular internal combustion engine. For example, in the case of an internal combustion engine of lower displacement volume, smaller tube diameters are needed, and in an internal combustion engine with a larger displacement volume, larger intake diameters and possibly also greater tube lengths are necessary. The air intake device can therefore be optimally adapted to the motor in question.

According to an additional embodiment of the invention the length of the flexible tube can also be varied as steplessly as desired. For this purpose the mouth of the flexible tube lies, for example, on a supporting body that is mounted for rotation. The tube also can be in contact with this supporting body. Of course, it is also possible to lengthen or shorten the flexible tube rectilinearly. In this case the supporting body would perform a longitudinal movement. The flexible tube is variable in lenght both rectilinearly and arcuately or circularly.

These and additional features of preferred embodiments of the invention will be found not only in the claims but also in the description and the drawings, and the individual features can be realized each by itself or together in the form of subcombinations in the embodiment of the invention and in other fields, and can constitute advantageous as well as independently patentable embodiments, for which protection is hereby claimed.

BRIEF DESCRIPTION OF THE DRAWINGS

The invention will be explained in detail below with reference to a working embodiment.

FIG. 2 shows a variant of an air intake device,

FIG. 3a shows a plan view of a variant of the air intake device,

FIG. 3b shows a plan view of the device according to FIG. 2, and

FIG. 4 shows a detail view.

DETAILED DESCRIPTION OF THE PREFERRED EMBODIMENT

Figure 1:
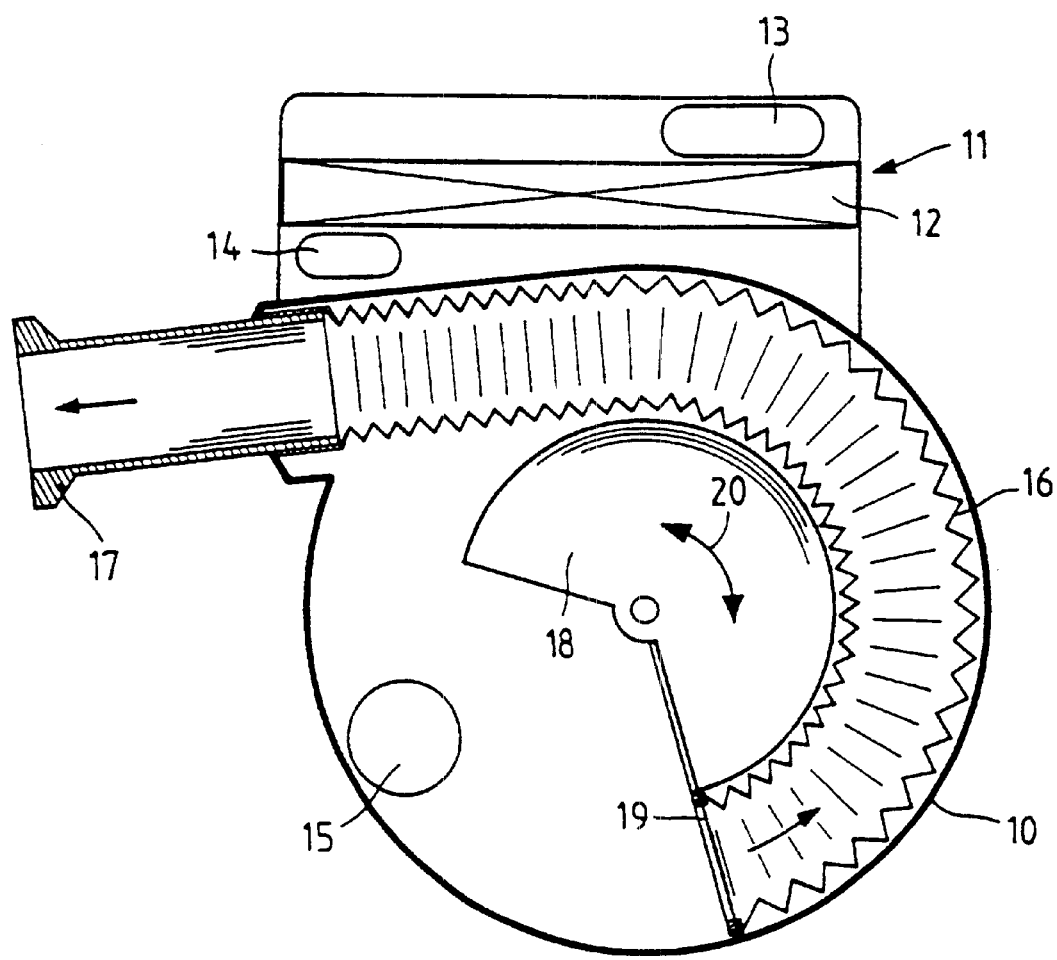
FIG. 1 shows an air intake device in a schematic sectional view.

The air intake device of FIG. 1 comprises a housing 10. On this there is disposed an air filter 11 with a filter element 12, a raw air inlet 13 and a clean air outlet 14. The clean air passes, starting out from the clean air outlet 14, via an interposed throttle valve, not shown, to clean air inlet 15 of the air intake device and flows through a flexible tube 16 to the connecting flange 17 and from there into the internal combustion engine, not shown. The flexible tube 16 lies on a supporting body 18 and is connected at the tube mouth 19 with the supporting body 18. The supporting body is mounted so as to be rotatable or movable in a spindle-like manner. A rotary movement of the supporting body 18 according to arrow 20 leads to a change of length, so that the length of the intake tube can be adapted to the operating conditions of the motor. The flexible tube can comprise a corrugated, thin-walled, synthetic resin tube without reinforcement, so that the flexible tube can be compressed or stretched approximately equal amounts from it's initial length.

The air intake device advantageously comprises of a synthetic resin housing. The housing can, of course, also be made as a metal housing. Since the supporting body does not need to provide any sealing functions, only a slight friction needs to be overcome when adjusting the position of the supporting body 18. The flexible tube 16 lies loosely on the supporting body 18. Contact of the tube 16 with the wall of the housing 10 does not occur, so that no additional friction forces need to be taken into account.

FIG. 2 shows a variant. Corresponding parts are provided with the same reference numbers. The flexible tube 16 is arranged on a supporting drum 21 enclosed on all sides and is likewise attached thereto at the tube mouth 19. The hollow space in the supporting drum can be used for any desired additional peripheral components of the engine. The flexible tube is guided closely on all sides between the connecting flange 17 and its contact with the supporting drum, so that when it is turned back it will not kink and cannot jam in the guide.

As already mentioned in FIG. 1, the air intake device is coupled via a connecting flange to an internal combustion engine, not shown. The air intake device carries the injection nozzles for the fuel in the vicinity of the connecting flange. Furthermore, additional elements, such as air flow meters, fuel distributors and the like can be disposed on or integrated with the air intake device.

The flexible tube 16 is fastened to the connecting flange 17, for example, by an adhesive bond. Of course, the flexible tube can also be shrunk onto the connecting flange or be welded to it.

FIG. 3*a* shows the guidance of a flexible tube on a supporting drum 21 which is to be seen in FIG. 4. The spiral arrangement has the advantage that the supporting drum can execute two or more rotations and thus very large changes in length are possible. A flexible tube with two turns 29 and 30 is disposed on the supporting drum. The upper winding 29 leads to the connecting flange of the internal combustion engine. It is apparent that with this arrangement it is possible to carry out a change in the length of the intake duct through 2 turns of the flexible tube. Since the flexible tube is fixed in its position by guides 24 and 25 there is no need to fear deformation of the tube by vacuum.

FIG. 3*b* shows the guidance of the flexible tube 16 on a supporting drum, in which guides 24 to 27 are provided. In this arrangement a maximum of one rotation of the supporting drum 21 is possible. The entire arrangement can be constructed modularly, i.e., the air intake device is composed of two or more modules, wherein one module forms the filter system with the filter element 12, and the further module is the intake system of variable length. The modular construction has the advantage that it is possible without great difficulty to vary the individual elements to adjust to the engine.

FIG. 4 shows the positioning of the flexible tube 16 and the adjacent tube 22 on the supporting drum 21. Depending on the number of cylinders of the internal combustion engine, a corresponding number of variable flexible tubes are found on the supporting body.

What is claimed is:

1. An air intake device for an internal combustion engine comprising at least one collector and intake ducts branching separately to individual cylinders of the internal combustion engine, wherein the intake ducts extend into the collector and at least partially comprise a flexible tube mounted helically on a supporting body, wherein the supporting body is mounted so as to be rotatable or movable in a spindle-like manner.

2. An air intake device according to claim 1, wherein said flexible tube is a flexible synthetic resin tube.

3. An air intake device according to claim 1, wherein the flexible tube comprises a corrugated, thin-walled, synthetic resin tube without reinforcement, so that the flexible tube can be compressed or stretched approximately equal amounts from its initial length.

4. An air intake device according to claim 1, wherein the flexible tube has a fixed length and can be exchanged in a modular manner.

5. An air intake device according to claim 1, wherein the flexible tube is variable in length both rectilinearly and arcuately or circularly.

6. An air intake device according to claim 1, wherein the supporting body radially supports the flexible tube and comprises at least one radially outwardly directed flange member which support the tube axially of the support body.

7. Air intake device for an internal combustion engine, comprising a housing, and a filter element disposed in said housing, said housing having a raw air inlet and a clean air outlet, and a clean air channel arranged to guide air flowing through the clean air outlet to a flexible air intake tube of variable length and attached to a supporting body, wherein the supporting body is mounted so as to be rotatable or movable in a spindle-like manner.

8. An air intake device according to claim 7, wherein said housing has a modular construction comprising a first module containing a filter system and a second module containing the variable-length air intake tube.

* * * * *